3,492,401
ANTICARIOGENIC COMPOSITIONS COMPRISING SODIUM PENTAFLUOROSTANNITE, $NaSn_2F_5$, AND METHODS FOR UTILIZING SAME
Joseph C. Muhler, Indianapolis, Ind., assignor to Indiana University Foundation, Bloomington, Ind., a not-for-profit corporation of Indiana
No Drawing. Continuation-in-part of application Ser. No. 374,240, June 11, 1964. This application Feb. 8, 1968, Ser. No. 703,869
Int. Cl. A61k 27/00
U.S. Cl. 424—131
9 Claims

ABSTRACT OF THE DISCLOSURE

Compositions comprising anticariogenically effective and non-toxic amounts of sodium pentafluorostannite, $NaSn_2F_5$, are systemically effective anticariogenic agents. Such compositions comprise $NaSn_2F_5$ at a level of about 1.9 to about 15.0 milligrams by weight of the composition (i.e., at a level supplying fluoride ion at a level of about 0.5–4.0 milligrams). Ingestion of such $NaSn_2F_5$-containing compositions is an effective means of reducing dental caries in humans, with anticariogenic effects being obtained, not only in treated recipients, but also, where the recipient is a human pregnant female, in her ultimate offspring.

CROSS REFERENCE

This application is a continuation-in-part of applicant's co-pending United States patent application entitled Anticariogenic Compositions and Methods, Ser. No. 374,240, filed June 11, 1964, now abandoned.

BACKGROUND OF THE INVENTION

Field of the invention

This invention relates to a new composition of matter, sodium pentafluorostannite, $NaSn_2F_5$, and to uses thereof as a systemically effective anticariogenic agent. Further, the invention relates to a novel technique for reducing caries by the ingestion of stannous-containing fluoride salts, including the novel sodium pentafluorostannite disclosed herein, whereby systemic anticariogenic effects for the said salts may be obtained, both in treated recipients and, in the case of a pregnant female, in her ultimate offspring.

DESCRIPTION OF THE PRIOR ART

It is commonly recognized that the presence of small amounts of fluoride in drinking water (e.g., 1.0 μg. F/ml.) has a significant effect in reducing the incidence of dental caries in permanent teeth of human children consuming such water from birth through eight years of age. Soluble fluoride salts have been introduced into public water supplies in a number of communities with good results. This method of providing fluorine is not feasible, however, where drinking water is obtained from small, private fluoride-deficient sources such as individual wells, etc., rather than from fluoridated (naturally or fortified) common public sources. Further, the addition of fluorine to common public sources is not always accepted or permitted.

Topical application of aqeuous fluoride solutions by a dentist or dental hygienist provides an excellent measure of protection against caries. Various fluoride compounds have been employed in this manner, including sodium fluoride and stannous fluoride. Such topical treatments, although relatively effective, are expensive and extremely time consuming for both the profession and patient and thus are not always available to persons desiring them.

Limitations on the availability of fluoride prophylaxis by way of water supplies or the dental office have lead to extensive efforts to incorporate various fluoride salts in oral compositions for use in the home, most practicably obtained in the form of fluoride dentifrices. Although an effective toothpaste containing stannous fluoride as the anticariogenic agent and calcium pyrophosphate as the abrasive is commercially available, dental researchers have continued their efforts to find more effective anticariogenic agents and more effective manners for utilizing these agents in preventive dentistry.

SUMMARY OF THE INVENTION

In accordance with the present invention, novel anticariogenic compositions comprising anticariogenically effective and non-toxic amounts of sodium pentafluorostannite, $NaSn_2F_5$, have been developed. Such compositions have been found to exhibit systemic anticariogenic activity after oral ingestion thereof. Moreover, the sodium pentafluorostannite-containing compositions have been found to exert a placental transferring ability (even in the presence of calcium salts), so that dietary supplements having such stannous-containing fluoride salts formulated therein may be effectively utilized for a systemic anticariogenic effect on ultimate offspring of the recipient of the supplements. Compositions in accordance with the present invention preferably comprise about 1.9–15.0 milligrams of $NaSn_2F_5$ (i.e., at a level sufficient to supply about 0.5–4.0 milligrams fluoride ion). The preferred $NaSn_2F_5$ level is about 3.7 milligrams (1.0 mg. fluoride ion).

Accordingly, it is a primary object of this invention to provide compositions comprising an anticariogenic and nontoxic amount of sodium pentafluorostannite and which are adapted for oral ingestion and systemic anticariogenic efficacy.

Another object of this invention is to provide a dietary supplement composition comprising $NaSn_2F_5$ and having systemic anticariogenic efficacy, both in the recipient thereof and, in the case of pregnant female recipients, in her ultimate offspring.

It is a still further object of this invention to provide new methods for reducing the incidence of dental caries in humans.

These and other objects, advantages, and features of the subject invention will hereinafter appear, and, for purposes of illustration, but not of limitation, various exemplary embodiments of the subject invention are hereinafter described in detail.

DESCRIPTION OF THE PREFERRED EMBODIMENTS

In accordance with the subject invention, it has been found that a systemically effective anticariogenic agent may comprise an anticariogenically effective and non-toxic amount of sodium pentafluorostannite, $NaSn_2F_5$.

More particularly, compositions in accordance with the present invention comprise about 1.9 up to about 15.0 milligrams $NaSn_2F_5$ (about 0.5–4.0 milligrams calculated as fluoride ion). Optimal compositions comprise about 3.7 milligrams $NaSn_2F_5$ (1.0 milligram calculated as fluoride ion). As will hereinafter be described in detail, such compositions are systemically effective on both a pre- and post-natal basis in humans. Where used post-natally, such compositions should comprise about 1.9 milligrams $NaSn_2F_5$ (0.5 milligram, calculated as fluoride ion) up to age three, and 3.7 milligrams $NaSn_2F_5$ thereafter (1.0 milligram calculated as fluoride ion).

The formulation and characteristics of sodium pentafluorostannite, $NaSn_2F_5$, are set forth in detail in applicant's co-pending divisional application, Ser. No. 652,642, filed May 22, 1967.

Compositions in accordance with the present invention may be in solid dosage unit form (e.g., capsules or tablets) or they may be formulated in liquid form. Usually, the $NaSn_2F_5$ is provided with a suitable amount (e.g., several hundred milligrams) of a non-toxic, physiologically inert carrier. Suitable carriers include polyhydric alcohols (e.g., sorbitol, mannitol, polyethylene glycol, glycerol or glycerin, prophylene glyco, and the like); fatty acids (e.g., oleic, palmitic or stearic acid, and the like); esters of sorbitan (e.g., products commercially available under the trademarks "Tween 80" and "Tween 20"); natural and synthetic binders (e.g., gum tragacanth, acacia, agar, gelatin, carboxymethyl cellulose, hydroxyethyl cellulose, and the like); fatty acid salts (e.g., magnesium stearate and the like); inert silicates (e.g., kaolin, talc, and the like); starches and saccharides (e.g., lactose and the like); and mixtures thereof. The exact amount of the carrier is of course not critical as it merely serves to provide the agent in a dosage form suitable for convenient human consumption.

Alternatively, or additionally, such anticariogenic composition may further serve as a dietary supplement comprising vitamins and/or minerals in suitable amounts and proportions (e.g., at minimum daily requirement levels) as are well known to those skilled in the art.

Pre-natal products in accordance with the present invention advantageously comprise one or more calcium salts in amounts lying between about 100–400 milligrams, and, preferably, about 200–300 milligrams, calculated as calcium ion. The optimal calcium level is about 250 milligrams, calculated as calcium ion. Suitable non-toxic calcium salts include calcium carbonate ($CaCO_3$); calcium gluconate ($C_{12}H_{22}O_{14}Ca \cdot H_2O$); calcium glycerophosphate ($C_3H_7O_6CaP$); calcium lactate ($C_6H_{10}O_6Ca$); calcium phosphate, monobasic [$Ca(H_2PO_4)_2 \cdot H_2O$]; calcium phosphate, dibasic ($CaHPO_4$); calcium phosphate, tribasic [$Ca_3(PO_4)_2$]; calcium propionate ($C_6H_{10}O_4Ca$); calcium pyrophosphate ($Ca_2P_2O_7$); and calcium tartrate $$(CaC_4H_4O_6 \cdot 4H_2O)$$

Exemplary compositions in accordance with the present invention are set forth in the following examples. In addition to the constituents set forth in the following examples will of course contain minor amounts of excipients for manufacturing and consumer acceptance purposes. Suitable excipients include hydroxyethyl cellulose, magnesium stearate, acacia, gelatin, Kaolin, sodium saccharin, and artificial color, flavorings and the like.

Examples I and II are pre-natal vitamin-mineral tablets or capsules comprising $NaSn_2F_5$ at a level of 1.0 milligram fluoride, calculated as fluoride ions.

EXAMPLE I

| | | |
|---|---|---|
| Sodium pentafluorostannite | mg | 3.74 |
| Iron (as ferrous iumarate) | mg | 40 |
| Calcium carbonate | mg | 250 |
| Vitamin C (ascorbic acid) | mg | 100 |
| Vitamin $B_1$ (thiamine) | mg | 1.5 |
| Vitamin $B_2$ (riboflavin) | mg | 2.5 |
| Vitamin $B_3$ (niacinamide) | mg | 15 |
| Vitamin $B_6$ (pyridoxine) | mg | 3 |
| Calcium pantothenate | mg | 5 |
| Vitamin $B_{12}$ (cyanocobalamin) | μg | 2 |
| Vitamin A (palmitate) | USP units | 6000 |
| Vitamin D (calciferol) | USP units | 400 |

EXAMPLE II

| | | |
|---|---|---|
| Sodium pentafluorostannite | mg | 3.74 |
| Vitamin A (acetate or palmitate) | I.U.[1] | 4000 |
| Vitmain D | I.U. | 400 |
| Vitamin C | mg | 75 |
| Vitamin $B_1$ | mg | 3 |
| Vitamin $B_2$ | mg | 2 |
| Vitamin $B_3$ | mg | 10 |
| Vitamin $B_6$ | mg | 5 |
| Vitamin $B_{12}$ | μg | 3 |
| Iron | mg | 40 |
| Calcium (lactate as calcium ion) | mg | 250 |

Examples III and IV are post-natal, chewable vitamin tablets comprising sodium pentafluorostannite.

EXAMPLE III

| | | |
|---|---|---|
| Sodium pentafluorostannite | mg | 1.87 |
| Vitamin A | I.U. | 4000 |
| Vitamin C | mg | 75 |
| Vitamin D (calciferol) | I.U. | 400 |
| Vitamin $B_1$ | mg | 1.0 |
| Vitamin $B_2$ | mg | 1.5 |
| Vitamin $B_3$ | mg | 10.0 |
| Vitamin $B_6$ | mg | 1.0 |
| Vitamin $B_{12}$ | μg | 1.5 |
| Mannitol | mg | 363.4 |
| Starch | mg | 28.0 |
| Saccharin soluble | mg | 1.0 |
| Acacia | mg | 7.0 |
| Flavor | mg | 3.0 |
| Magnesium stearate | mg | 6.0 |
| FD & C color | μg | 8.0 |

[1] International units.

EXAMPLE IV

| | | |
|---|---|---|
| Sodium pentafluorostannite | mg | 3.74 |
| Vitamin A | I.U. | 4000 |
| Vitamin C | mg | 75 |
| Vitamin D | I.U. | 400 |
| Vitamin $B_1$ | mg | 1.0 |
| Vitamin $B_2$ | mg | 1.5 |
| Vitamin $B_3$ | mg | 10.0 |
| Vitamin $B_6$ | mg | 1.0 |
| Vitamin $B_{12}$ | μg | 1.5 |
| Mannitol | mg | 361.5 |
| Starch | mg | 28.0 |
| Saccharin soluble | mg | 1.0 |
| Acacia | mg | 7.0 |
| Flavor | mg | 3.0 |
| Magnesium stearate | mg | 6.0 |
| FD & C color | μg | 8.0 |

Example V is a suitable pre-natal non-vitamin $NaSn_2F_5$ preparation and Examples VI and VII are post-natal non-vitamin $NaSn_2F_5$ preparations.

EXAMPLE V

| | | |
|---|---|---|
| Sodium pentafluorostannite | mg | 3.74 |
| Lactose | mg | 186.47 |
| Starch | mg | 26.00 |
| Acacia | mg | 6.50 |
| Saccharin sodium | mg | 0.40 |
| Magnesium stearate | mg | 2.50 |
| FD & C Red #2 and #3 (coloring) | μg | 42 |

EXAMPLE VI

| | | |
|---|---|---|
| Sodium pentafluorostannite | mg | 1.87 |
| Mannitol | mg | 451.93 |
| Starch | mg | 28.0 |
| Saccharin soluble | mg | 1.0 |
| Acacia | mg | 7.0 |
| Tartaric acid | mg | 1.2 |
| Flavor | mg | 3.0 |
| Magnesium stearate | mg | 6.0 |
| FD & C color | μg | 8.0 |

EXAMPLE VII

| | | |
|---|---|---|
| Sodium pentafluorostannite | mg | 3.74 |
| Mannitol | mg | 450.06 |
| Starch | mg | 28.0 |
| Saccharin soluble | mg | 1.0 |
| Acacia | mg | 7.0 |
| Tartaric acid | mg | 1.2 |
| Flavor | mg | 3.0 |
| Magnesium stearate | mg | 6.0 |
| FD & C color | μg | 8.0 |

Example VIII gives the composition of a 0.6 cc. dose of a liquid $NaSn_2F_6$-vitamin preparation. A dosage of 0.6 cc./day yields the required minimum level of $NaSn_2F_5$ (0.5 milligram calculated as fluoride ion).

EXAMPLE VIII

| | | |
|---|---|---|
| Sodium pentafluorostannite | mg | 1.87 |
| Vitamin A | I.U. | 3000 |
| Vitamin D | I.U. | 400 |
| Vitamin C | mg | 60 |

The balance of the formulation consists of sorbitol, water, Tween 80, and artificial sweetening agents, flavors, and color.

Example IX gives the composition of a 1.0 cc. daily dose which provides $NaSn_2F_5$ at a level of 0.5 milligram, calculated as fluoride ion.

EXAMPLE IX

| | | |
|---|---|---|
| Sodium pentafluorostannite | mg./ml. | 3.74 |
| Sorbitol | mg | 54.0 |
| Distilled water | mg | 41.158 |
| Tween 20 | mg | 0.7 |
| Flavor | mg | 0.13 |
| FD & C color | mg | 0.012 |

It should be understood that the constituents of the foregoing preparations other than $NaSn_2F_5$ are conventional as are the amounts and proportions thereof except, however, that as hereinafter set forth in detail, it has been unexpectedly discovered that the utilization of calcium salts in these preparations does not adversely effect the anticariogenic activity of the preparations.

inhalation, and the heads were removed, coded, and examined for dental caries by conventional techniques (as described by Muhler et al., "Studies on Stannous Fluoride and Other Fluorides in Relation to the Solubility of Enamel in Acid and the Prevention of Experimental Dental Caries," J. Dent. Res., 33:33, 1954).

The dental caries data for the three groups are shown in Table I. The control animals were found to have an average of 6.70 carious lesions, while the animals which received 1.0 mg. of fluoride as NaF daily by stomach tube were found to have an average of 4.51 carious lesions and the animals which received an identical amount of fluoride as $NaSn_2F_5$ were found to have an average of 3.69 carious lesions. As shown in Table I, this finding represents a mean percent reduction in carious lesions of 32.7% and 44.9% for NaF and $NaSn_2F_5$, respectively demonstrating a significantly ($p=0.001$) greater effectiveness with the use of $NaSn_2F_5$.

The average severity of the individual lesions was quite comparable in the three groups, but, when severity was evaluated in terms of the amount of tooth substance actually afflicted by caries, values of 30.8, 18.9, and 16.0 were obtained in Groups 1, 2, and 3 respectively.

The general findings observed in the incidence of dental caries are reflected in the data relative to the amount of tooth substance afflicted with caries. The control animals were found to have a mean carious area rating of 30.8, while values of 18.9 and 16.0 were found in Groups 2 and 3, representing significant ($p=0.001$) reductions of 38.6 and 48.1 percent, as compared to the values found in the control animals. Once again a significantly greater ($p=0.001$) effectiveness in reducing dental caries was seen with the use of $NaSn_2F_5$.

One possible explanation for the greater effectiveness of $NaSn_2F_5$ in reducing dental caries in rats is the fact that the presence of tin with fluoride apparently imparts a greater anticariogenic potential than fluoride alone. At any rate, regardless of the possible explanation, the reported caries data indicate that significant reductions can be obtained in both caries incidence and severity with both NaF and $NaSn_2F_5$ and that a significantly greater effectiveness can be attributed to $NaSn_2F_5$ as compared to NaF.

TABLE I.—DENTAL CARIES DATA FOLLOWING SYSTEMIC ADMINISTRATION OF NaF AND $NaSn_2F_5$

| Group | Regimen | Mean No. Lesions | Mean Percent Red. | t | p | Mean Severity | Mean Carious Area Score | Mean Percent Red. in Area | t | p |
|---|---|---|---|---|---|---|---|---|---|---|
| 1 | Dist. H₂O | *6.70±0.45 | | | | 2.10 | 30.8±2.5 | | | |
| 2 | NaF | 4.51±0.51 | 32.7 | 14.411 | 0.001 | 1.99 | 18.9±2.5 | 38.6 | 15.113 | 0.001 |
| 3 | NaSn₂F₅ | 3.69±0.45 | 44.9 | 20.743 | 0.001 | 2.02 | 16.0±2.5 | 48.1 | 18.189 | 0.001 |

POST-NATAL SYSTEMIC ANTICARIOGENIC EFFECTIVENESS OF $NaSn_2F_5$

The post-natal systemic anticariogenic effectiveness of $NaSn_2F_5$ can be demonstrated by the dental caries experience of rats (standard experimental animals for anticariogenic studies) treated with fluoridated drinking water on a comparative controlled diet study, as in the following manner.

A total of 153 weanling male rats were divided equally into three groups (1, 2, and 3) according to body weight. The animals were housed in wire cages in an air-conditioned room and were provided distilled water ad libitum. They were maintained on a low-fluoride stock corn diet for nine days prior to initiating the study and for ten days after the study was begun. The composition of the stock corn diet was as follows (in percent): yellow corn meal, 64.0; powdered whole milk, 30.0; alfalfa meal, 4.8; iodized salt, 1.0; and irradiated yeast, 0.2.

During the experimental period, each group of animals was given the following solutions daily by stomach tube: Group 1, 1.0 ml. distilled water; Group 2, 1.0 mg. fluoride as NaF in 1.0 ml. water; and Group 3, 1.0 mg. fluoride as $NaSn_2F_5$ in 1.0 ml. water. At the end of the experimental period, the animals were sacrificed by chloroform The forgoing animal studies have been confirmed in a human clinical study. A group of children between the ages of 2 and 3, residing in non-fluoride areas were given a thorough dental caries examination with the aid of bitewing radiographs. This group was then divided into two sub-groups according to dental ages and past dental experience. Each day the members of Group 1 (control) were given a chewable vitamin table and Group 2 received a chewable tablet containing the same vitamins, and additionally 1.0 mg. of F as $NaSn_2F_5$. Both groups were given thorough dental examinations six months and twelve months after the test was begun.

Table II reports the results of these tests in terms of "deft" (decayed, exfoliated, and filled deciduous teeth) and "defs" (decayed, exfoliated, and filled deciduous surfaces). The data reported in Table II demonstrate the high level of effectiveness in the reduction of dental caries of the $NaSn_2F_5$ comprising the present invention. In particular, after six months a mean percentage reduction of 46.0 and 49.8 in the incidence of "deft" and "defs" respectively, was found in Group 2 as compared with Group 1 (control). In the examinations conducted after twelve months the corresponding figures were 65% and 71.2%. No deleterious effect due to the use of the subject invention could be found. Thus, the study reported in Table II verifies and confirms the post-natal (i.e., pediatric) utility of $NaSn_2F_5$ as a systemic anticariogenic agent.

At the birth of the pups all of the mothers and their litters were placed on distilled water and a corn-sucrose cariogenic diet. The composition of the corn-sucrose cario-

TABLE II.—SUMMARY OF PRELIMINARY CLINICAL FINDINGS AFTER SIX AND TWELVE MONTHS

| Group | Number subjects | Regimen | Initial deft | Initial deft | Mean deft increment | Mean Percent reduction | Mean deft increment | Mean percent reduction |
|---|---|---|---|---|---|---|---|---|
| | | | 6-MONTH DATA | | | | | |
| 1 | 46 | Control | 1.28 | 1.63 | 1.63 | | 2.35 | |
| 2 | 33 | $NaSn_2F_5$ | 1.57 | 2.15 | 0.88 | 46.0 | 1.18 | 49.8 |
| | | | 12-MONTH DATA | | | | | |
| 1 | 31 | Control | 1.13 | 1.39 | 2.74 | | 5.20 | |
| 2 | 24 | $NaSn_2F_5$ | 1.66 | 2.21 | 0.96 | 65.0 | 1.50 | 71.2 |

PRE-NATAL UTILIZATION OF $NaSn_2F_5$ AND OTHER STANNOUS-CONTAINING FLUORIDE SALTS

The foregoing enamel solubility and dental caries studies exemplify the anticariogenic potential of the novel $NaSn_2F_5$ as asystemically effective anticariogenic agent in an orally ingested composition. However, in another of its aspects, the present invention embraces the use of $NaSn_2F_5$ with particular regard to the pre-natal treatment of pregnant human females in order to impart a lessened tendency for caries incidence in the deciduous teeth of the ultimate offspring.

It has not heretofore been recognized that certain fluoride salts have the ability to pass the placenta in order to partake in the embryonic development of the ultimate offspring and thereby to render the deciduous teeth of such offspring less susceptible to caries incidence. This placental passing nature of the fluoride salts described herein suggests the use of such salts a component of dietary supplements for pregnant females (e.g., vitamin and mineral supplements). However, it is well known that pregnant females are desirably maintained on a high calcium diet (e.g., commercial pre-natal dietary supplements contain a substantial amount of calcium salts), and therefore an essential requisite of an effective pre-natal anticariogenic technique would be the compatibility of the anticariogenic placenta passing agent with ionic calcium.

An important aspect of the present invention resides in the discovery that the ability of NaF to pass the placenta is significantly retarded by the presence of ionic calcium, while the ability of sodium pentafluorostannite disclosed herein to similarly pass the placenta is substantially unimpaired by the corresponding presence of ionic calcium.

A comparative study of a variety of fluoride compounds was undertaken to determine the ability of the compounds to provide fluoride to a developing placenta and to evaluate the effect of placentally-transferred fluoride upon the future caries experience of the offspring. A total of sixty young adult female Wistar rats were divided into four equal groups. The animals were mated and maintained on a low fluoride stock corn diet comprising (in percent): yellow corn meal, 64.0; powdered whole milk, 30.0; alfalfa meal, 4.3; iodized salt, 1.0; and irradiated yeast, 0.2. The various fluorides were provided in the drinking water as follows: Group 1, distilled water (control); Group 2, NaF; Group 3, $SnF_2$; and Group 4, $NaSn_2F_5$. All the fluorides were added at a concentration of 100 p.p.m. fluoride and were prepared fresh daily.

At the birth of the pups all of the mothers and their litters were placed on distilled water and a corn-sucrose cariogenic diet. The composition of the corn-sucrose cariogenic diet was as follows (in percent): yellow corn grits, 46.0; powdered whole milk, 28.5; sucrose, 19.5; alfalfa meal, 4.8; iodized salt, 1.0; and irradiated yeast, 0.2. The pups were maintained on this regimen for a period of eight weeks after birth. At the end of this period, they were sacrificed by chloroform inhalation, and the heads were removed, coded, and scored for caries according to conventional methods (described in Muhler et al. op. cit., J. Dent. Res., 33, 33, 1954).

The data obtained are shown in Table III. The control males were found to have an average of 11.00 carious lesions while a value of 9.94 was found for the females. The animals whose mothers had received 100 p.p.m. fluoride as NaF during the pre-natal period were found to have an average of 12.89 and 11.21 lesions for males and females, respectively. When $SnF_2$ was provided to the mothers during the pre-natal development, caries scores of 6.73 and 7.14 were found in the males and females, respectively, representing reductions of 38.8 and 28.2 percent when compared to the controls. When $NaSn_2F_5$ was provided as the pre-natal fluoride, even greater reductions were obtained in the males with a 57.0 percent reduction in caries, while a 43.7 percent reduction was obtained in the females.

The caries severity values as well as the carious area severity values, which consider the average depth of the lesion and the average involved area respectively, tend to show the same general trends as shown by the number of carious lesions, although more pronounced differences are seen when the total involved area is considered. The growth data (which are also shown in Table III) indicate that pre-natal fluoride administration had no apparent effect upon the average weight gain. In fact, numerically greater weight gains occurred in many of the prenatal fluoride groups as compared to that of the controls.

TABLE III.—WEIGHT GAIN AND CARIES DATA IN OFFSPRING OF RATS WHICH RECEIVED 100 P.P.M. FLUORIDE IN THE DRINKING WATER ONLY DURING THE PRE-NATAL PERIOD

| Group | Pre-natal regimen | Sex | Final No. animals | Mean final weight (g.) | Mean No. lesions | Mean percent reduction | Mean severity | Mean area severity score | Percent reduction in area severity |
|---|---|---|---|---|---|---|---|---|---|
| 1 | Distilled water | M | 13 | 77.1±24.0 | 11.00±3.58 | 0 | 2.32 | 63.8±25.2 | 0 |
| | | F | 16 | 69.4±24.9 | 9.94±3.34 | 0 | 2.28 | 55.6±25.7 | 0 |
| 2 | NaF | M | 9 | 78.9±12.0 | 12.89±5.23 | +17.2 | 2.15 | 63.2±33.9 | 0.9 |
| | | F | 14 | 75.6±15.3 | 11.21±2.61 | +12.8 | 2.34 | 65.2±23.4 | +17.3 |
| 3 | $SnF_2$ | M | 11 | 77.6±17.7 | 6.73±3.52 | 38.8 | 2.38 | 41.1±21.5 | 35.6 |
| | | F | 14 | 87.5±25.1 | 7.14±3.63 | 28.2 | 2.21 | 37.5±22.7 | 32.6 |
| 4 | $NaSn_2F_5$ | M | 14 | 87.6±32.5 | 4.73±2.54 | 57.0 | 1.92 | 18.7±11.6 | 70.7 |
| | | F | 12 | 89.3±19.7 | 5.60±3.78 | 43.7 | 2.02 | 24.7±18.8 | 55.6 |

The foregoing data clearly indicate that the administration of pre-natal fluorides to rats can serve to significantly alter the dental caries experience in the offspring. The data further indicate that this effect is a function of the fluoride compound being administered, since NaF failed to produce any beneficial effect, while the same level of fluoride in the form of $NaSn_2F_5$ produced a 50% protection against dental caries. While the data suggest that the presence of the stannous ion is required along with the fluoride ion to produce a beneficial effect, it is apparent that the structure of the stannous-containing fluoride salt is of great importance since $SnF_2$ was only about 60% as worth-while as $NaSn_2F_5$.

The pre-natal utility of the $NaSn_2F_5$ compositions of the present invention have been confirmed by human clinical data. In the human evaluations, three groups of mothers (Groups 1, 2, and 3) were supplied daily tablets containing 1 mg. F (as $NaSn_2F_5$), 1 mg. F (as NaF), and 1 mg. Cl (as NaCl), as control, respectively, with the remaining pill bulk constituting mannitol, a conventional carrier which is not metabolized in the oral cavity. All mothers commenced ingestion of the pills within three months of conception and continued daily ingestions until parturation. The three year caries history of the resultant children are expressed in Table IV in terms of "deft" (decayed, exfoliated (and filled deciduous teeth) and "defs" (decayed, exfoliated, and filled deciduous surfaces).

It is apparent from these results that pre-natal NaF provides no significant caries control for ultimate offspring, while pre-natal $NaSn_2F_5$ significantly reduces caries susceptibility in the offspring. This phenomenon can be explained only by the unique ability of the stannous-containing fluoride salt (i.e., in this study, $NaSn_2F_5$) to pass through the placenta and to affect the formation of the offspring's teeth in a manner that yields improved oral hygiene even up to three years after birth.

thirty days. At the end of the thirty day interval, the animals were sacrificed by chloroform inhalation, and the pelts and both femurs were removed. The carcasses and the femurs were separately ashed and analyzed for fluoride.

The results obtained from the fluoride analyses of the carcasses are summarized in Table V. The results obtained from the femur fluoride analyses are also shown in Table V, and these data tend to reflect the findings noted in the whole carcasses. The data of Table V reveal that the effect of added dietary calcium upon the retention of fluoride administered as NaF is very pronounced. The addition of 0.5 percent calcium as calcium carbonate (Group C) reduced the carcass fluoride retention by 10.1 percent, this value being significant at the 0.001 level. When calcium lactate was added to the diet as the source of calcium, the retention of fluoride as NaF was again significantly ($p=0.001$) decreased by 15.1 percent, as compared to the respective control value obtained in Group B. Even more pronounced decreases were found when the calcium was added as the phosphate salts (Groups E and F). Here highly significant ($p=0.001$)

TABLE IV.—PRE-NATAL HUMAN CLINICAL STUDIES

| | | | | Three year data | | | |
|---|---|---|---|---|---|---|---|
| Group | Regimen | No. mothers | No. children | Deft | Percent Red. | Defs | Percent Red. |
| 1 | $NaSn_2F_5$ | 56 | 61 | 3.61 | 40.8 | 4.88 | 51.6 |
| 2 | NaF | 56 | 55 | 6.08 | 0.3 | 9.75 | 0.3 |
| 3 | NaCl (control) | 49 | 45 | 6.10 | | 10.10 | |

CALCIUM ION COMPATABILITY OF PRE-NATAL FLUORIDES

As previously indicated, the compatibility of the placenta-passing fluoride salt with ionic calcium is an important consideration in determining the practical effectiveness of such a salt for use in a pre-natal dietary supplement technique. The following studies demonstrate the effect of the presence of ionic calcium on the carcass and femur retention of fluoride from NaF and $NaSn_2F_5$.

A total of 110 weanling female Wistar rats were divided into eleven equal groups according to body weight. All animals were housed in wire screen cages in an air-conditioned room and received distilled water ad libitum. The animals were provided with one of the following diets ad libitum: Groups A, B, and G, a low fluoride stock diet, the composition of which was as follows (in percent): yellow corn meal, 64.0; powdered whole milk, 30.0; alfalfa meal, 2.8; iodized salt, 1.0; and irradiated yeast, 2.0; Groups C and H, a diet containing added 0.4 percent calcium as calcium carbonate added at the expense of corn meal; Groups D and I, a diet containing 0.5 percent added calcium as calcium lactate; Groups E and J, a diet containing 0.5 percent added calcium as monobasic calcium phosphate; and Groups F and K, a diet containing 0.5 percent added calcium as dibasic calcium phosphate. In addition, the animals in Groups B through F received 1.0 mg. fluoride as NaF daily by stomach tube, while the animals in Groups G through K received the same amount of fluoride in a similar manner as $NaSn_2F_5$. The animals were maintained on these respective regimens for decreases in fluoride retention of 17.5 and 19.1 percent were found.

The effects of identical dietary calcium levels upon the retention of fluoride administered as $NaSn_2F_5$ are in contrast to those obtained when NaF was used as a source of fluoride. The addition of 0.5 percent calcium to the diet resulted in no significant changes in the retention of fluoride in the whole carcass as compared to the amount retained in the absence of added dietary calcium. This effect was noted in all four groups which received added dietary calcium, with the solubility and physical properties of the particular calcium salt employed as a source of calcium having no detectable effect upon the retention of fluoride.

The results obtained in the femur analysis quite closely parallel the findings obtained in the analyses of the whole carcass. Again, the addition of dietary calcium significantly ($p=0.001$) decreased the skeletal retention of fluoride administered as NaF. When $NaSn_2F_5$ was used as a source of fluoride, none of the calcium-enriched diets were found to appreciably alter the retention of fluoride.

In confirmation of these data, additional studies have shown that the rate of fluoride absorption in rats was decreased when ionic calcium was present and NaF was used as a source of fluoride. In contrast, when $NaSn_2F_5$ was employed as a source of fluoride, the rate of fluoride absorption was increased by the presence of ionic calcium. No explanation of these findings is readily apparent, but these data clearly indicate the specificity involved in the use of different fluoride compounds in the presence of different sources of calcium.

TABLE V.—CARCASS AND FEMUR FLUORIDE DATA IN THE PRESENCE AND ABSENCE OF ADDED DIETARY CALCIUM

| | Supplemental ions | | Carcass data | | | Filter data | | | | |
|---|---|---|---|---|---|---|---|---|---|---|
| Group | F (1.0 mg./da.) | Calcium (0.5%) | Mean ash wt. (g.) | Mean, p.p.m. F | Mean μg. F | Mean ash Wt. (mg.) | Mean, p.p.m. F | Mean μg. F | Net percent F. Ret.[2] | Percent Change Due to Ca |
| A | | | [1] 4.345±0.143 | [1] 213.8±12.6 | [1] 932.7±52.7 | [1] 291.5±12.2 | [1] 261.4±18.1 | [1] 75.3±5.0 | | |
| B | NaF | | 4.399±0.169 | 4,091±181 | 17,850±440 | 293.5±14.8 | 5,979±316 | 1,740±60 | 61.96 | |
| C | NaF | $CaCO_3$ | 4.569±0.097 | 3,530±127 | 16,050±410 | 292.0±8.2 | 4,858±180 | 1,410±50 | 54.86 | −11.5 |
| D | NaF | $CaC_6H_{10}O_6 5H_2O$ | 3.842±0.146 | 3,969±176 | 15,160±670 | 250.9±10.9 | 5,519±268 | 1,370±70 | 51.76 | −16.5 |
| E | NaF | $Ca(H_2PO_4)_2H_2$ | 4.812±0.121 | 3,075±124 | 14,720±480 | 343.3±13.7 | 4,241±139 | 1,450±50 | 50.56 | −18.4 |
| F | NaF | $CaHPO_4$ | 5.113±0.206 | 2,839±91 | 14,440±600 | 358.5±10.8 | 3,990±154 | 1,430±60 | 49.56 | −20.0 |
| G | $NaSn_2F_5$ | | 3.816±0.212 | 4,331±200 | 16,160±340 | 237.7±14.7 | 6,546±379 | 1,510±30 | 55.56 | |
| H | $NaSn_2F_5$ | $CaCO_3$ | 3.940±0.194 | 4,190±158 | 16,260±390 | 258.9±15.7 | 6,207±216 | 1,590±70 | 56.16 | +1.1 |
| I | $NaSn_2F_5$ | $CaC_6H_{10}O_6 5H_2O$ | 3.706±0.078 | 4,189±65 | 15,480±380 | 248.5±8.4 | 5,985±140 | 1,490±80 | 53.23 | −4.2 |
| J | $NaSn_2F_5$ | $Ca(H_2PO_4)_2H_2O$ | 3.720±0.157 | 4,055±225 | 16,570±460 | 252.1±13.1 | 6,403±299 | 1,590±70 | 57.20 | +3.0 |
| K | $NaSn_2F_5$ | $CaHPO_4$ | 4.221±0.211 | 3,986±175 | 16,730±410 | 279.8±17.0 | 5,531±240 | 1,520±50 | 57.50 | +3.5 |

[1] Standard deviation of the mean. [2] Obtained by combining carcass and femur values and subtracting the respective control values.

Thus, it will be seen that the present invention includes not only novel anticariogenic compositions comprising $NaSn_2F_5$, but also novel methods for reducing the incidence of dental caries in humans on both a pre-natal and a post-natal (i.e., pediatric) basis.

It should be understood that various changes and modifications may be effected in the details of formulation and the manner of application of the various exemplary embodiments described herein, without departing from the spirit and the scope of the instant invention, as defined in the appended claims.

1. An anticariogenic composition adapted for oral ingestion comprising about 1.9–15.0 milligrams sodium pentafluorostannite, $NaSn_2F_5$.

2. A composition, as claimed in claim 1, which comprises about 3.7 milligrams of sodium pentafluorostannite, $NaSn_2F_5$.

3. In a composition comprising a non-toxic calcium ion containing salt, the improvement comprising sodium pentafluorostannite, $NaSn_2F_5$, being present in the composition at a level of about 1.9–15.0 milligrams.

4. An anticariogenic composition adapted for oral ingestion comprising about 1.9–15.0 milligrams of sodium pentafluorostannite, $NaSn_2F_5$, and about 100–400 milligrams, calculated as calcium ion, of a member selected from the group consisting of calcium carbonate ($CaCO_3$); calcium gluconate ($C_{12}H_{22}O_{14}Ca \cdot H_2O$); calcium glycerophosphate ($C_3H_7O_6CaP$); calcium lactate ($C_6H_{10}O_6Ca$); calcium phosphate, monobasic [$Ca(H_2PO_4)_2 \cdot H_2O$]; calcium phosphate, dibasic ($CaHPO_4$); calcium phosphate, tribasic [$Ca_3(PO_4)_2$]; calcium propionate ($C_6H_{10}O_4Ca$); calcium pyrophosphate ($Ca_2P_2O_8$); and calcium tartrate ($CaC_4H_4O_6 \cdot 4H_2O$).

5. A method for reducing the incidence of dental caries in humans comprising the step of ingesting an anticariogenic composition comprising about 1.9–15.0 milligrams of sodium pentafluorostannite, $NaSn_2F_5$.

6. A method for reducing the dental caries susceptibility of human offspring comprising the step of orally administering to the female parent thereof during the pre-natal period an anticariogenic composition comprising about 1.9–15.0 milligrams sodium pentafluorostannite, $NaSn_2F_5$.

7. A method, as claimed in claim 6, wherein the composition comprises about 3.7 milligrams of sodium pentafluorostannite, $NaSn_2F_5$.

8. In a method comprising the step of orally administering a composition comprising a non-toxic calcium ion containing salt to the human female parent during the pre-natal period, the improvement comprising providing about 1.9–15.0 milligrams of sodium pentafluorostannite, $NaSn_2F_5$, in the composition in order to reduce the dental caries susceptibility of the offspring thereof.

9. A method for reducing the dental caries susceptibility of human offspring comprising the step of orally administering to the female parent thereof during the pre-natal period an anticariogenic composition comprising about 1.9–15.0 milligrams of sodium pentafluorostannite, $NaSn_2F_5$, and about 100–400 milligrams, calculated as calcium ion, of a member selected from the group consisting of calcium carbonate ($CaCO_3$); calcium gluconate ($C_{12}H_{22}O_{14}Ca \cdot H_2O$); calcium glycerophosphate ($C_3H_7O_6CaP$)

calcium lactate ($C_6H_{10}O_6Ca$); calcium phosphate, monobasic [$Ca(H_2PO_4)_2 \cdot H_2O$]; calcium phosphate, dibasic ($CaHPO_4$); calcium phosphate, tribasic [$Ca_3(PO_4)_2$]; calcium propionate ($C_6H_{10}O_4Ca$); calcium pyrophosphate ($Ca_2P_2O_7$); and calcium tartrate ($CaC_4H_4O_6 \cdot 4H_2O$).

References Cited

UNITED STATES PATENTS 3,070,510   12/1962   Cooley et al. 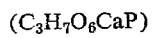 424—52

OTHER REFERENCES

American Drug Index, 1963, published by J. B. Lippincott Co., Phila., p. 149.

Journal of Dental Research, vol. 40, No. 4, July–August 1961, p. 725.

McDonald et al., Acta. Cryst., vol. 17, pp. 1104–1108, September 1964.

Schaap et al., J. Amer. Chem. Soc., vol. 76, pp. 5226–5228, 1954.

RICHARD L. HUFF, Primary Examiner